United States Patent
Park

(10) Patent No.: US 10,788,843 B2
(45) Date of Patent: Sep. 29, 2020

(54) COOPERATIVE DRIVING METHOD BY WHICH FOLLOW VEHICLE MERGES WITH OR DIVERGES FROM COOPERATIVE DRIVING AND COOPERATIVE DRIVING METHOD BY WHICH LEAD VEHICLE CONTROLS MERGING WITH OR DIVERGING FROM COOPERATIVE DRIVING

(71) Applicant: MANDO CORPORATION, Pyeongtaek-si, Gyeonggi-do (KR)

(72) Inventor: Man Bok Park, Seoul (KR)

(73) Assignee: MANDO CORPORATION, Pyeongtaek-si, Gyeonggi-do (KR)

(*) Notice: Subject to any disclaimer, the term of this patent is extended or adjusted under 35 U.S.C. 154(b) by 46 days.

(21) Appl. No.: 15/414,624

(22) Filed: Jan. 25, 2017

(65) Prior Publication Data

US 2017/0212527 A1 Jul. 27, 2017

(30) Foreign Application Priority Data

Jan. 26, 2016 (KR) .................. 10-2016-0009122

(51) Int. Cl.
*G01D 1/02* (2006.01)
*G08G 1/00* (2006.01)
(Continued)

(52) U.S. Cl.
CPC .......... *G05D 1/0295* (2013.01); *B60W 10/04* (2013.01); *B60W 10/18* (2013.01); *B60W 10/20* (2013.01);
(Continued)

(58) Field of Classification Search
CPC ............. G05D 1/0295; G05D 1/0293; G05D 2201/0213; H04L 67/18; H04L 67/12;
(Continued)

(56) References Cited

U.S. PATENT DOCUMENTS

2010/0256852 A1* 10/2010 Mudalige ............... G08G 1/163
701/24
2014/0107867 A1 4/2014 Yamashiro
(Continued)

FOREIGN PATENT DOCUMENTS

CN 203283159 U 11/2013
CN 104925048 A 9/2015
(Continued)

OTHER PUBLICATIONS

Korean Office Action for corresponding Korean Patent Application No. 10-2016-0009122 dated Feb. 16, 2017, citing the above reference(s).

(Continued)

*Primary Examiner* — Jeffrey C Boomer
(74) *Attorney, Agent, or Firm* — Hauptman Ham, LLP

(57) ABSTRACT

Disclosed is a cooperative driving method including transmitting information on a merging request to a lead vehicle which is singly driving or cooperatively driving, receiving information indicating whether merging is possible from the lead vehicle which has determined whether the merging is possible, a merging step in which, when information indicating that the merging is possible is received, the follow vehicle merges, transmitting information indicating that the merging is being performed to the lead vehicle, determining whether the merging of the follow vehicle has been completed based on a longitudinal distance from a first preceding vehicle or a transverse distance from a lane line, and a merging completion step of, when it is determined that the merging has been completed, releasing the transmission of the information indicating that the merging is being performed.

4 Claims, 16 Drawing Sheets

(51) Int. Cl.
  *B60W 30/165* (2020.01)
  *B60W 30/18* (2012.01)
  *G08G 1/16* (2006.01)
  *H04L 29/08* (2006.01)
  *B60W 10/04* (2006.01)
  *B60W 10/18* (2012.01)
  *B60W 10/20* (2006.01)
  *G05D 1/02* (2020.01)

(52) U.S. Cl.
  CPC .... *B60W 30/165* (2013.01); *B60W 30/18163* (2013.01); *G05D 1/0293* (2013.01); *G08G 1/162* (2013.01); *G08G 1/22* (2013.01); *H04L 67/12* (2013.01); *H04L 67/18* (2013.01); *B60W 2556/65* (2020.02); *B60W 2754/30* (2020.02); *G05D 2201/0213* (2013.01)

(58) Field of Classification Search
  CPC ... G08G 1/22; G08G 1/162; B60W 30/18163; B60W 10/18; B60W 10/20; B60W 30/165; B60W 10/04; B60W 2754/30; B60W 2556/65
  See application file for complete search history.

(56) References Cited

U.S. PATENT DOCUMENTS

| | | | |
|---|---|---|---|
| 2015/0251656 A1* | 9/2015 | Yester | B60W 30/09 701/41 |
| 2016/0185388 A1* | 6/2016 | Sim | B62D 15/0255 701/41 |
| 2016/0214612 A1* | 7/2016 | Kashiba | B60W 10/04 |
| 2017/0053534 A1* | 2/2017 | Lokesh | B60W 30/165 |
| 2017/0225682 A1* | 8/2017 | Schunk | B60W 30/165 |
| 2017/0344023 A1* | 11/2017 | Laubinger | G05D 1/0272 |
| 2018/0050673 A1* | 2/2018 | D'sa | B60W 30/0953 |
| 2018/0137763 A1* | 5/2018 | Derag Rden | G05D 1/0295 |
| 2018/0170384 A1* | 6/2018 | Masui | B60R 21/00 |
| 2018/0293894 A1* | 10/2018 | Zhang | G08G 1/167 |

FOREIGN PATENT DOCUMENTS

| | | |
|---|---|---|
| CN | 105160865 A | 12/2015 |
| JP | 2009-239584 A | 10/2009 |
| JP | 4603910 B2 | 12/2010 |
| JP | 2011-148483 A | 8/2011 |
| JP | 2014-078170 A | 5/2014 |
| JP | 2014-211714 A | 11/2014 |
| KR | 10-2015-0106260 A | 9/2015 |
| KR | 10-2015-0113626 A | 10/2015 |

OTHER PUBLICATIONS

Chinese Office Action dated Sep. 12, 2019, in connection with Chinese Patent Application No. 201710126234.4, citing the above references.

* cited by examiner

COOPERATIVE DRIVING METHOD BY WHICH FOLLOW VEHICLE MERGES WITH OR DIVERGES FROM COOPERATIVE DRIVING AND COOPERATIVE DRIVING METHOD BY WHICH LEAD VEHICLE CONTROLS MERGING WITH OR DIVERGING FROM COOPERATIVE DRIVING

CROSS REFERENCE TO RELATED APPLICATION

This application claims priority from Korean Patent Application No. 10-2016-0009122, filed on Jan. 26, 2016, which is hereby incorporated by reference for all purposes as if fully set forth herein.

BACKGROUND OF THE INVENTION

1. Field of the Invention

The present invention relates to a coorperative driving technology.

2. Description of the Prior Art

As Information & Communication Technologies (ICT) are grafted onto vehicles, a Cooperative Intelligent Transportation System (C-ITS) has been researched.

Traffic advanced countries have shown various C-ITS demonstration projects and services, and such services may be divided into a service that provides traffic safety information close to traffic accidents and a service that provides driver convenience information.

Meanwhile, the prior arts focused on the development of services limited to communication between infrastructure and vehicles through a Wireless Access in Vehicular Environment (WAVE) technology developed for moving vehicles at a high speed. That is, in the existing communication services, a Road Side Unit (RSU) installed at a roadside transmits information required for traffic to an On Board Unit (OBU) or vehicles exchange data required for services such as Internet.

In order to handle the recently increasing volume of traffic and maximize use efficiency of an expressway, a vehicle platoon or vehicle cooperative driving technology in which a plurality of vehicles drive as a group while keeping a close distance therebetween has been researched and developed.

However, a vehicle cooperative driving technology for allowing another vehicle to merge in the cooperative driving or to diverge from the cooperative driving during the vehicle cooperative driving has not been developed.

SUMMARY OF THE INVENTION

In such a background, according to an aspect of the present invention, an objective of the present invention is to provide a vehicle cooperative driving technology to allow merging with the cooperative driving and diverging from the cooperative driving during the vehicle cooperative driving.

In accordance with an aspect of the present invention, a cooperative driving method is provided. The cooperative driving method includes a first transmission step of transmitting information on a merging request to a lead vehicle which is singly driving or cooperatively driving, a first reception step of receiving information indicating whether merging is possible from the lead vehicle which has determined whether the merging is possible, a merging step in which, when information indicating that the merging is possible is received, the follow vehicle merges, a second transmission step of transmitting information indicating that the merging is being performed to the lead vehicle, a merging completion determination step of determining whether the merging of the follow vehicle has been completed based on a longitudinal distance from a first preceding vehicle or a transverse distance from a lane line, and a merging completion step of, when it is determined that the merging has been completed, releasing the transmission of the information indicating that the merging is being performed.

In accordance with another aspect of the present invention, a cooperative driving apparatus is provided. The cooperative driving apparatus includes a merging request transmitter for transmitting information on a merging request to a lead vehicle which is singly driving or cooperatively driving, a receiver for receiving information on whether the merging is possible from the lead vehicle, and a controller for controlling a steering device, an acceleration device, and a braking device to follow the lead vehicle when the information on whether the merging is possible is received.

In accordance with another aspect of the present invention, a cooperative driving method by which a lead vehicle controls merging with or diverging from a cooperative driving is provided. The cooperative driving method includes receiving information on a merging request from a follow vehicle by the lead vehicle, determining whether the merging of the follow vehicle is possible, when it is determined that the merging is possible, transmitting information on whether the merging is possible and information on a first preceding vehicle, which is cooperatively driving in front of a position where the follow vehicle merges to the follow vehicle, and when the merging of the follow vehicle has been completed, transmitting information on a merging end.

In accordance with another aspect of the present invention, a cooperative driving apparatus is provided. The cooperative driving apparatus includes a receiver for receiving information on a merging request from a follow vehicle, a transmitter for transmitting information on whether the merging is possible to the follow vehicle, and a controller for, when it is determined that the merging of the follow vehicle is possible, transmitting information on a first preceding vehicle, which is cooperatively driving in front of a position where the follow vehicle merges, to the follow vehicle through the transmitter.

As described above, according to the present invention, it is possible to provide the vehicle cooperative driving technology to allow the merging with the cooperative driving and the diverging from the cooperative driving during the vehicle cooperative driving.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1A:
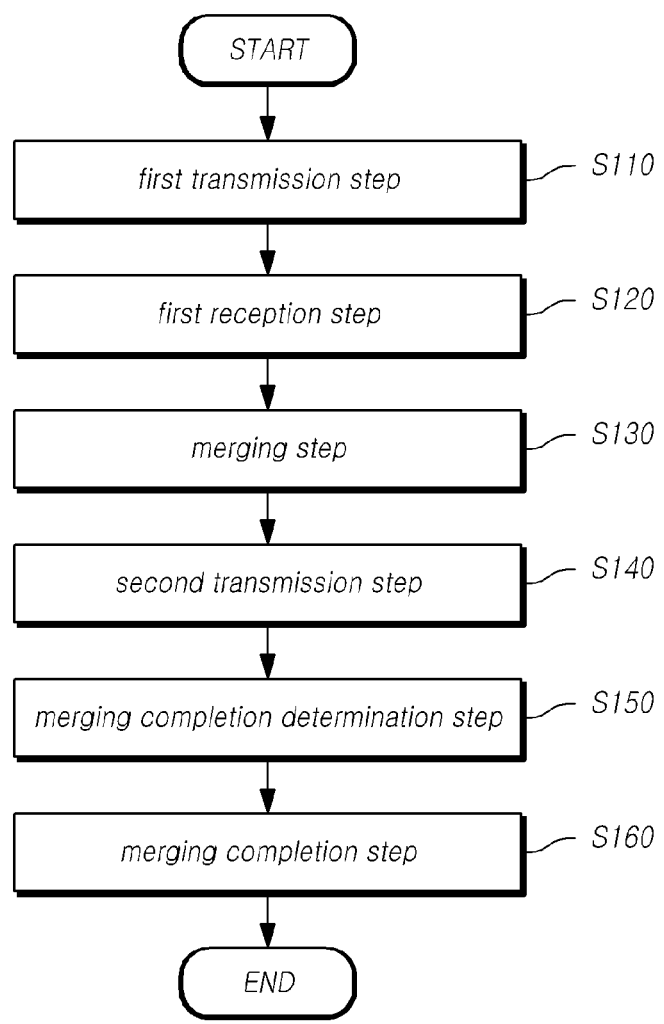
FIG. 1A is a flowchart illustrating a cooperative driving method according to an embodiment of the present invention.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 1B:
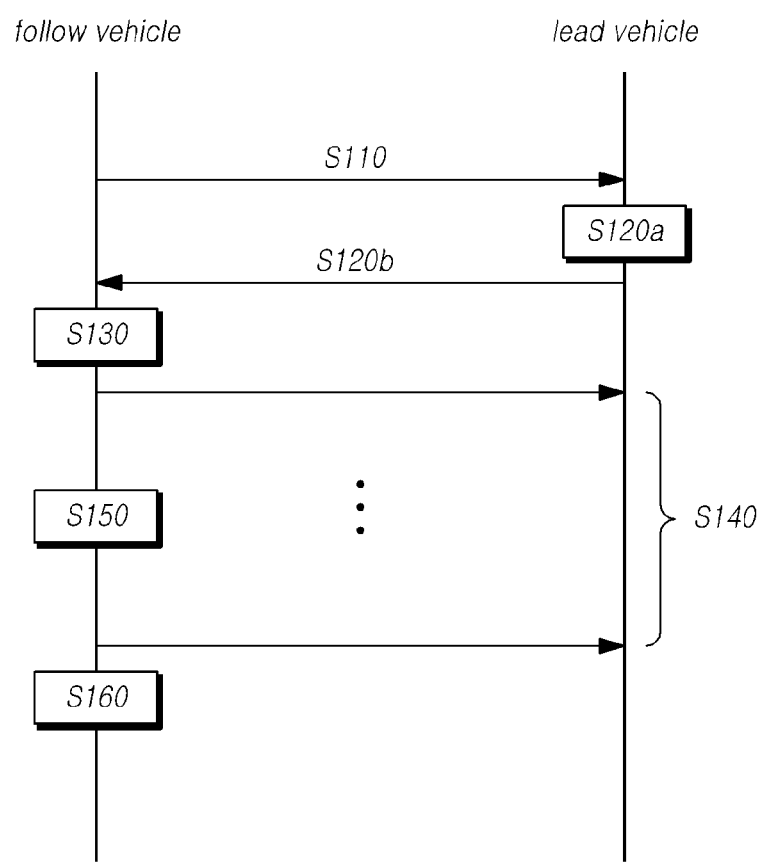
FIG. 1B illustrates an operation of the cooperative driving method according to the embodiment of the present invention.

FIG. 1A is a flowchart illustrating a cooperative driving method according to an embodiment of the present invention, and FIG. 1B illustrates an operation of a cooperative driving method according to an embodiment of the present invention.

Referring to FIGS. 1A and 1B, a cooperative driving method S100 according to an embodiment of the present invention may include a first transmission step S110 in which a follow vehicle transmits information on a merging request to a lead vehicle that is singly driving or cooperatively driving, a first reception step S120 of receiving information indicating whether merging is possible from the lead vehicle that determines whether the follow vehicle can merge in step S120a, a merging step S130 in which the follow vehicle merges when the information indicating that the merging is possible is received in step S120, a second transmission step S140 of transmitting information indicating that the merging is being performed to the lead vehicle, a merging completion determination step S150 of determining whether the follow vehicle has completely merged based on a longitudinal distance from a first preceding vehicle or a transverse distance from a lane line, and a merging completion step S160 of releasing transmission of the information on merging through step S140 when it is determined that the merging has been completed in step S150.

In the first transmission step S110 and the second transmission step S140, the follow vehicle and the lead vehicle may use a Vehicle to Everything (V2X) communication technology including a Vehicle to Vehicle (V2V) communication technology and a Vehicle to Infrastructure (V2I) communication technology.

The follow vehicle may refer to a vehicle that follows the lead vehicle to cooperatively drive. The lead vehicle may be a singly driving vehicle or a cooperatively driving vehicle, or may include preceding vehicles except for a head vehicle.

That is, in the first transmission step S110, the follow vehicle may transmit the merging request to the lead vehicle through the V2X communication technology.

Although it is described in the present specification that transmission/reception of information is mainly made by a subject, which processes the transmitted/received information, for easy description of a process according to the present invention, a vehicle broadcasts the information in the V2V communication, so that not only the subject, which processes the information, but also all vehicles that drive within a communication-possible range of the vehicle having transmitted the information and infrastructures may receive the information.

When the follow vehicle transmits the information on the merging request to the lead vehicle through the first transmission steps S110, the lead vehicle may determine in step S120a whether the follow vehicle can merge in the first reception step S120.

For example, in the first reception step S120, the lead vehicle may determine whether the follow vehicle can merge based on a limit according to a communication technology or a limit according to a programing technology.

More specifically, for example, when the follow vehicle merges and then it is determined that an interval between the lead vehicle and the follow vehicle is 100 m or shorter under a circumstance where a communication technology having a communication-possible interval of 100 m between the lead vehicle and the follow vehicle is applied, the lead vehicle may determine that the follow vehicle can merge in the first reception step S120.

More specifically, for example, when it is determined that the number of vehicles from the head vehicle to the follow vehicle to merge is 10 or smaller under a circumstance where a programing technology authenticated for 10 or smaller cooperatively driving vehicles including the lead vehicle is applied, the lead vehicle may determine that the follow vehicle can merge in the first reception step S120.

When it is determined that the follow vehicle can merge, the lead vehicle transmits information indicating that the merging of the follow vehicle is possible. Further, the lead vehicle may transmit information on a first preceding vehicle that is cooperatively driving in front of a position where the follow vehicle merges to the follow vehicle.

For example, the lead vehicle may transmit information on an ID of the first preceding vehicle to the follow vehicle. Here, the ID may be an identification number of the first preceding vehicle or a cooperative driving number based on a driving order of a cooperatively driving vehicle.

Further, the lead vehicle may also transmit information on a current location of the first preceding vehicle.

The first preceding vehicle is a vehicle that can perform the V2V communication, and transmits the ID and the current location of the first preceding vehicle to the surroundings of the first preceding vehicle during the cooperative driving.

The follow vehicle may identify the first preceding vehicle, which is cooperatively driving in front of the position where the follow vehicle merges, based on the information received from the lead vehicle.

Further, the follow vehicle may identify a position to which the follow vehicle has to move to merge with the cooperative driving based on the ID and location information of the first preceding vehicle transmitted from the first preceding vehicle.

At this time, the follow vehicle may display the position where the follow vehicle has to merge and the location information of the first preceding vehicle through a display device within the vehicle based on the information received from the lead vehicle and the first preceding vehicle.

That is, the follow vehicle may easily identify a movement path to merge with the cooperative driving through locations of the follow vehicle and the first preceding vehicle displayed through the display device.

When the follow vehicle receives the information indicating that the merging is possible from the lead vehicle in step S120b, the follow vehicle may merge with the cooperative driving in which the follow vehicle follows the lead vehicle in the merging step S130.

Accordingly, the follow vehicle may drive at the very last position, but the present invention is not limited thereto and the follow vehicle may drive between cooperatively driving vehicles.

Here, when the follow vehicle merges between the cooperatively driving vehicles, the lead vehicle may control a cooperative driving distance between the existing cooperatively driving vehicles before the follow vehicle merges.

For example, the lead vehicle identifies the first preceding vehicle, which is cooperatively driving in front of the position where the follow vehicle merges and a first trailing vehicle which is cooperatively driving behind the position where the follow vehicle merges.

Further, the lead vehicle transmits information on a request for changing the cooperative driving distance from the first preceding vehicle to the first trailing vehicle.

That is, in order to make the follow vehicle merge between the first preceding vehicle and the first trailing vehicle, the lead vehicle transmits the information to instruct the first trailing vehicle and the first preceding vehicle to cooperatively drive with an increased cooperative driving distance therebetween.

At this time, trailing vehicles, which are cooperatively driving behind the first trailing vehicle, cooperatively drive while maintaining the existing cooperative driving distance. Accordingly, when the first trailing vehicle decreases the speed and increases the cooperative driving distance from the first preceding vehicle, the trailing vehicles after the first trailing vehicle maintain the cooperative driving distance while decreasing the speed like the first trailing vehicle.

When the follow vehicle has completely merged between the first preceding vehicle and the first trailing vehicle, the lead vehicle may transmit again information on a request for maintaining the cooperative driving distance to the first trailing vehicle to maintain the cooperative driving distance between the follow vehicle and the first trailing vehicle.

In a process of performing the merging step S130, the follow vehicle may perform the second transmission step S140 of transmitting information indicating that the merging is being performed to the lead vehicle through the V2X communication technology. That is, the second transmission step S140 may be performed simultaneously with the merging step S130.

In the merging completion determination step S150, it may be determined whether the follow vehicle has completely merged based on the longitudinal distance from the lead vehicle and the transverse distance from the lane line.

For example, when a value generated by subtracting a second time, which is generated by dividing a distance between the first preceding vehicle and the second preceding vehicle by a speed of the first preceding vehicle, from a first time, which is generated by dividing a distance between the follow vehicle and the first preceding vehicle in the longitudinal direction by a speed of the follow vehicle, is equal to or smaller than a preset longitudinal threshold value, it may be determined that the merging has been completed in the merging completion determination step S150.

Here, the second preceding vehicle refers to a vehicle that is cooperatively driving while maintaining a cooperative driving distance from the first preceding vehicle in front of the first preceding vehicle.

That is, when a value generated by subtracting a ratio of the distance from the second preceding vehicle to the speed of the first preceding vehicle from a ratio of the distance from the first preceding vehicle to the speed of the follow vehicle is within a predetermined range, it may be determined that the merging of the follow vehicle has been completed.

In the above example, the determination of the longitudinal direction is only for improving the accuracy and the determination is not limited to the longitudinal direction. In another example, when a distance between the lane line which the follow vehicle crosses to merge with the cooperative driving in the transverse direction and a distance from the wheel of the follow vehicle is larger than or equal to a first transverse threshold value, it may be determined that the merging has been completed in the merging completion determination step S150.

Here, the lane line that the follow vehicle crosses to merge refers to a lane line that the follow vehicle crosses while moving to the side among lines of the lanes on which the lead vehicle is driving.

When it is identified that the current location of the follow vehicle is within a crossroad on which the lead vehicle is driving, the follow vehicle may sense lane lines through a sensor such as a camera installed in the opposite side to a direction in which the follow vehicle merges with the cooperative driving and measure a distance between the sensed lane line and the wheel of the follow vehicle.

In the other example above, the first transverse threshold value may be set based on a distance between the cooperatively driving vehicle and the lane line. That is, when the cooperatively driving vehicle is designed to drive with an interval of 30 cm from the lane line, the first transverse threshold value may be 30 cm or may be 30 cm or longer or 30 cm or shorter reflecting an acceptable error.

In another example, when a value generated by subtracting a second time, which is generated by dividing a distance between the first preceding vehicle and the second preceding vehicle by a speed of the first preceding vehicle, from a first time, which is generated by dividing a distance between the follow vehicle and the first preceding vehicle by a speed of the follow vehicle, is equal to or smaller than a preset longitudinal threshold value and when a distance between the lane line that the follow vehicle crosses to merge in the transverse direction and the wheel of the follow vehicle is larger than or equal to a first transverse threshold value, it may be determined that the merging has been completed in the merging completion determination step S150. This complexly reflects the above described example and other example.

Through the above operation, when it is determined that the follow vehicle has been completely merged with the merging completion determination step S150, the second transmission step S140 of transmitting the information indicating that the merging is being performed may be released in the merging completion step S160.

As described above, based on the cooperative driving method S100 according to an embodiment of the present invention, the follow vehicle may provide convenience to a driver of the follow vehicle by following the lead vehicle that is driving. Further, the follow vehicle may reduce fuel consumption through the decrease in sudden unintended acceleration or sudden braking, thereby acquiring an effect of improving fuel efficiency.

In addition, based on the cooperative driving method S100 according to an embodiment of the present invention, the follow vehicle may actively determine whether the follow vehicle has completely merged with the cooperative driving and not perform an unnecessary operation after the merging with the cooperative driving has been completed, thereby acquiring an effect of solving the problem such as an operation delay due to processing of data more than necessary.

Moreover, based on the cooperative driving method according to the present invention, the follow vehicle may further receive information on a cooperative driving number from the lead vehicle that assigns cooperative driving numbers based on the driving order after the merging with the cooperating driving in the first reception step S120 according to an embodiment of the present invention.

The cooperative driving method S100 according to an embodiment of the present invention will be described in detail with reference to FIGS. 2A to 4.

Figure 2A:
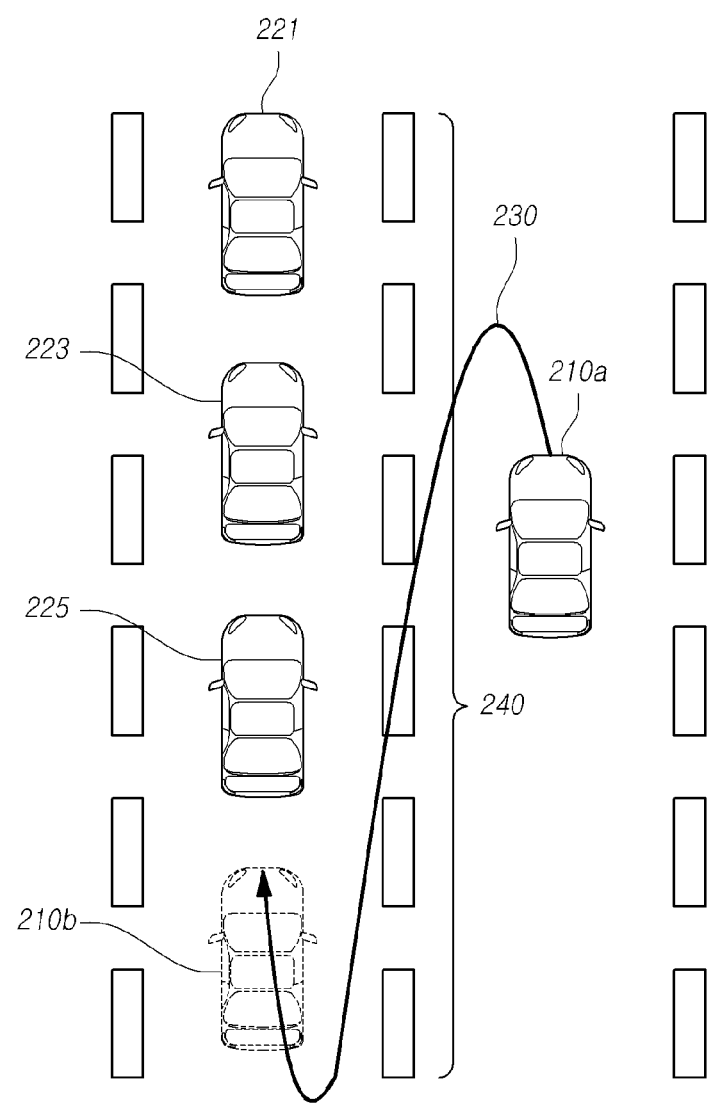
FIGS. 2A and 2B illustrate the operation of the cooperative driving method according to the embodiment of the present invention.
Figure 2B:
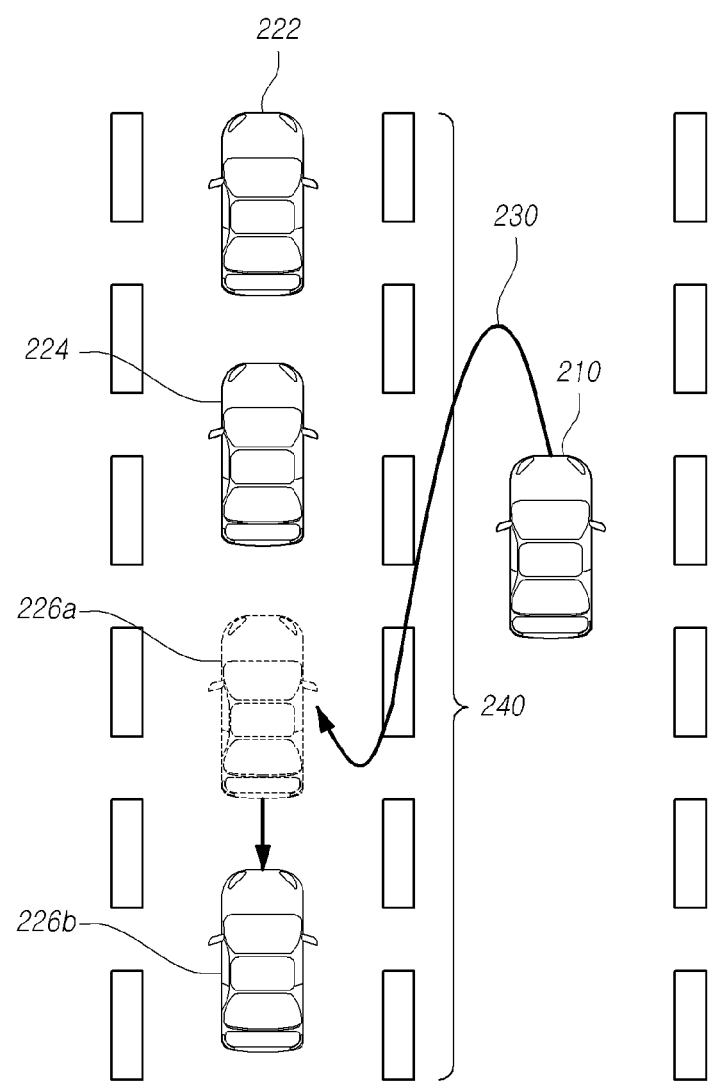
Figure 3:
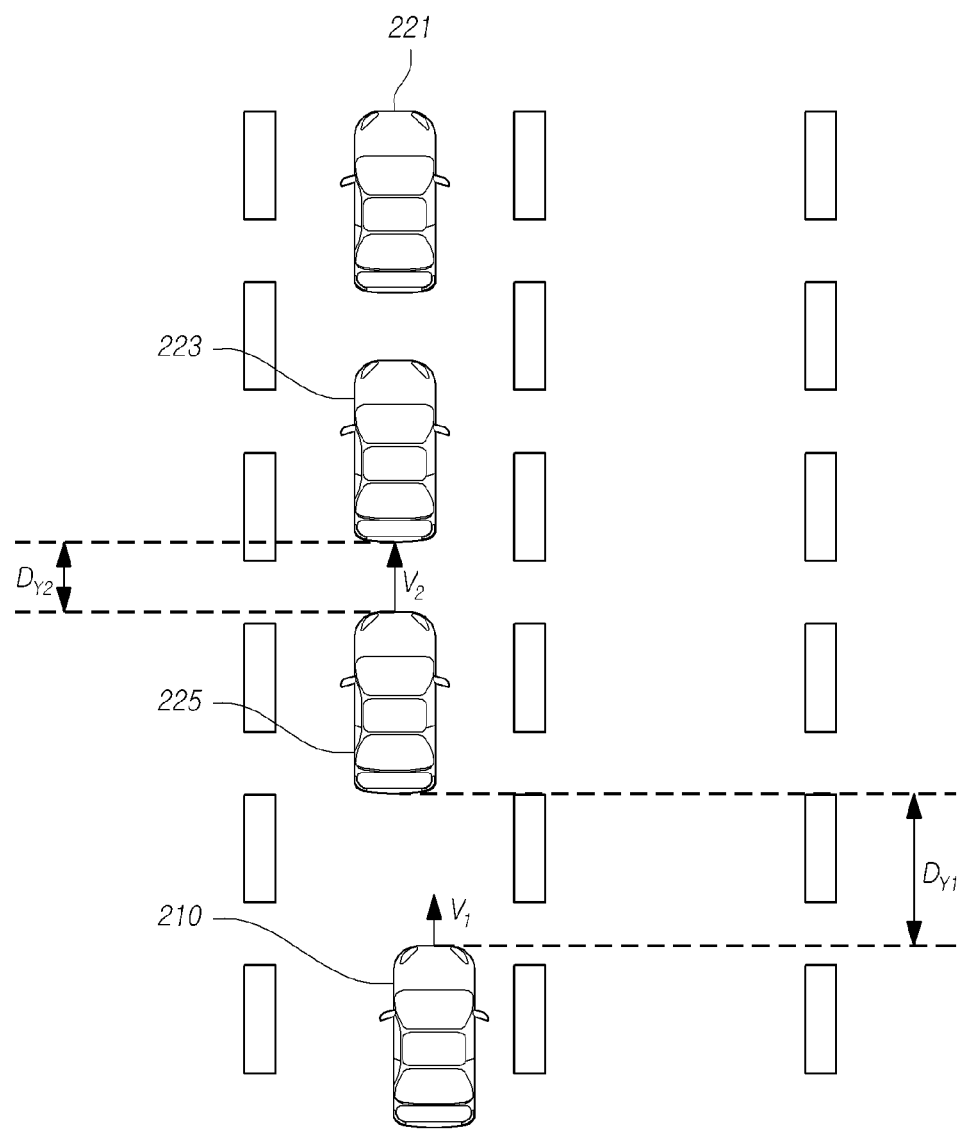
FIG. 3 illustrates an example of an operation in a merging completion determination step according to the embodiment of the present invention.
Figure 4:
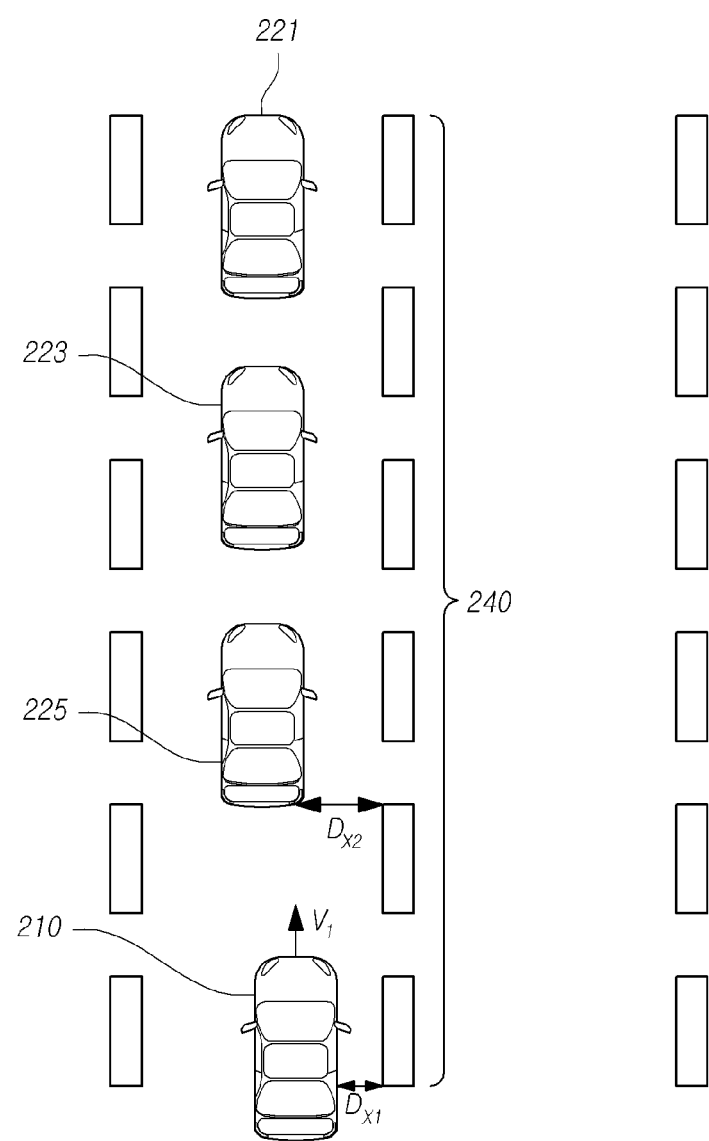
FIG. 4 illustrates another example of the operation in the merging completion determination step according to the embodiment of the present invention.

FIGS. 2A and 2B illustrate an operation of the cooperative driving method according to an embodiment of the present invention, FIG. 3 illustrates an example for an operation of the merging completion determination step according to an embodiment of the present invention, and FIG. 4 illustrates another example for the operation of the merging completion determination step according to an embodiment of the present invention.

In a description of the cooperative driving method according to an embodiment of the present invention with reference to FIG. 2A, a follow vehicle 210a may transmit a merging request to lead vehicles 221, 223, and 225 that are cooperatively driving through the V2X communication technology in a merging request step.

In general, the follow vehicle 210 may make a request for merging with the cooperative driving through communication with the head vehicle 221 that is at the head of the cooperatively driving lead vehicles 221, 223, and 225, but the present invention is not limited thereto. That is, the follow vehicle 210 may make the request for merging with the cooperative driving through communication with one vehicle corresponding to at least one of the cooperatively driving lead vehicles 221, 223, and 225, and may establish relations or communication with the one vehicle in the following steps. However, the following description will be made based on the head vehicle 221 which is at the head of the lead vehicles 221, 223, and 225 for convenience of the description, but the present invention is not limited thereto.

Thereafter, the follow vehicle 210a may receive information indicating whether the merging is possible from the head vehicle 221 that has determined whether the follow vehicle 210a can merge in the first reception step.

The determination, by the head vehicle 221, of whether the follow vehicle 210a can merge may comply with external factors including a technical limit.

Specifically, for example, when the follow vehicle has completely merged and then it is determined that an interval between the follow vehicle 210b and the head vehicle 221 is 100 m or shorter in a circumstance where a communication technology having 100 m of a communication-possible interval between the head vehicle 221 and the follow vehicle 210 is applied, the head vehicle 221 may determine that the follow vehicle 210a can merge with the cooperative driving.

More specifically, when it is determined that the interval from the head vehicle 221 is 100 m or shorter while the follow vehicle 210a, which has not merged, is driving along a first driving path 230, the head vehicle 221 may determine that the follow vehicle 210a can merge with the cooperative driving.

Specifically, in another example, since the number of vehicles from the head vehicle 221 to the follow vehicle 210 is 4 under a circumstance where a programing technology authenticated for 10 cooperatively driving vehicles including the head vehicle 221, the head vehicle 221 may determine that the follow vehicle 210a can merge.

When the head vehicle 221 determines that the follow vehicle 210a can merge with the cooperative driving of the lead vehicles 221, 223, and 225, the follow vehicle 210a may merge with the cooperative driving of the lead vehicles 221, 223, and 225 along the first driving path 230 in a merging step.

That is, the merging step is completed, the follow vehicle 210b may follow the first preceding vehicle 225 which is one of the lead vehicles 221, 223, and 225.

During a process in which the follow vehicle 210a merges along the first driving path 230 according to the merging step, the follow vehicle 210a may perform a second transmission step of transmitting information indicating that the merging is being performed to the preceding vehicle 221 through the V2X communication technology. Here, the merging step and the second transmission step may start the operation at the same time.

In the merging completion determination step, it may be determined whether the follow vehicle 210 has completely merged based on a longitudinal (Y) distance from the first preceding vehicle 225 and a transverse (X) distance from a lane line 240 during the process in which the follow vehicle 210 merges along the first driving path 230 according to the merging step.

Meanwhile, although the above described example illustrates a case where the follow vehicle 210 merges at the very end of the cooperatively driving vehicles, the follow vehicle 210 may merge between the cooperatively driving vehicles.

FIG. 2B illustrates a case where the follow vehicle 210 moves between the first preceding vehicle 224 and the first trailing vehicle 226 and merges with the cooperative driving in a circumstance where the lead vehicle 222, the first preceding vehicle 224, and the first trailing vehicle 226 are cooperatively driving.

Referring to FIG. 2B, the follow vehicle 210 transmits information on a merging request for merging with the cooperative driving, and the lead vehicle 222 receives the information on the merging request.

When the lead vehicle 222 receives the information on the merging request from the follow vehicle 210, the lead vehicle 222 determines whether the follow vehicle 210 can merge with the cooperative driving based on a range of a distance in which the cooperative driving is possible or a number of vehicles which can cooperatively drive.

Further, when the lead vehicle 222 determines that the follow vehicle 210 can merge with the cooperative driving, the lead vehicle 222 may determine a merging location of the follow vehicle 210 based on a current location of the follow vehicle 210.

For example, as illustrated in FIG. 2B, when the follow vehicle 210 makes the merging request in a state where the follow vehicle 210 is close between the first preceding vehicle 224 and the first trailing vehicle 226, the lead vehicle 222 may determine to allow the follow vehicle 210 to merge between the first preceding vehicle 224 and the first trailing vehicle 226.

The lead vehicle 222 may transmit information indicating that the merging is possible and information on the first preceding vehicle 224 to the follow vehicle 210 and allow the follow vehicle 210 to merge behind the first preceding vehicle 224.

At this time, prior to transmitting the information indicating that the merging is possible to the follow vehicle 210, the lead vehicle 222 may transmit information on a request for changing a cooperative driving distance between the first preceding vehicle 224 and the first trailing vehicle 226 to the first trailing vehicle 226.

Alternatively, before transmitting information on a merging start request after transmitting the information indicating that the merging is possible to the follow vehicle 210, the lead vehicle 222 may transmit the information on the request for changing the cooperative driving distance to the first trailing vehicle 226.

That is, as the lead vehicle 222 controls the cooperative driving distance between the first preceding vehicle 224 and the first trailing vehicle 226, the follow vehicle 210 may merge between the cooperatively driving vehicles.

When the follow vehicle 210 has completely merged with the cooperative driving, the lead vehicle 222 may allow the first trailing vehicle 226 to cooperatively drive while maintaining the cooperative driving distance from the follow vehicle 210. In a description with reference to FIG. 3, when equation (1) below is satisfied in which a value generated by subtracting a second time ($dT_2$), which is generated by dividing a distance ($D_{Y2}$) between the first preceding vehicle 225 and the second preceding vehicle 223 by a speed ($V_2$) of the first preceding vehicle 225, from a first time ($dT_1$), which is generated by dividing a distance ($D_{Y1}$) between the follow vehicle 210 and the first vehicle 225 by a speed ($V_1$) of the follow vehicle 210, is equal to or smaller than a preset longitudinal threshold value ($Y_{TH}$), it may be determined that the merging has been completed in a merging completion determination step according to an embodiment.

$$dT_1 - dT_2 \leq Y_{TH} \qquad \text{equation (1)}$$

In equation (1), $dT_1 = (D_{Y1}/V_1)$, $dT_2 = (D_{Y2}/V_2)$, and $Y_{TH}$ may be a time error.

In a detailed description of equation (1), when the follow vehicle 210 is merging along the first driving path 230 of FIG. 2A, the calculated first time ($dT_1$) always has a value larger than the second time ($dT_2$). In contrast, when the follow vehicle 210 has completely merged and is cooperatively driving, the calculated first time ($dT_1$) has a value which is the same as the second time ($dT_2$). According to such a characteristic, when the value generated by subtracting the second time ($dT_2$) from the first time ($dT_1$) is 0, it may mean that the follow vehicle 210 has completely merged.

However, this corresponds to a situation according to an ideal operation, and the value generated by subtracting the second time ($dT_2$) from the first time ($dT_1$) may be an error value, which is not 0, due to a variable according to a hardware operation or an actual operation even though the follow vehicle 210 has completely merged, and thus the time error ($Y_{TH}$) may reflect it.

Referring to FIG. 4, when equation (2) below is satisfied in which a distance ($D_{X1}$) between the lane line 240 which the follow vehicle 210 crosses to merge with the cooperative driving and the wheel of the follow vehicle is larger than or equal to a first transverse threshold value ($X_{TH1}$), it may be determined that the merging has been completed in the merging completion determination step according to another embodiment.

$$D_{X1} \geq X_{TH1} \qquad \text{equation (2)}$$

In equation (2), $X_{TH1} = a*D_{X2}$, a denotes an acceptable error rate, which may be a value between 0 and 1.

In a detailed description of equation (2), when the follow vehicle 210 is merging along the first driving path 230 of FIG. 2A, the distance ($D_{X1}$) between the lane line 240, which the follow vehicle 210 crosses to merge with the cooperative driving, and the wheel of the follow vehicle 210 always has a value smaller than a distance ($D_{X2}$) between the crossed lane line 240 and the wheel of the cooperatively driving first preceding vehicle 225. Here, the distance ($D_{X1}$) may be defined as a positive value when the follow vehicle 210 is in a left side of the lane line 240, and the distance ($D_{X1}$) may be defined as a negative value when the follow vehicle 210 is in a right side of the lane line 240.

Unlike this, when the follow vehicle 210 has completely merged and is cooperatively driving (210b of FIG. 2), the distance ($D_{X1}$) between the crossed lane line 240 and the wheel of the follow vehicle 210 has the same value as the distance ($D_{X2}$) between the crossed lane line 240 and the wheel of the cooperatively driving first preceding vehicle 225.

According to such a characteristic, when the distance ($D_{X1}$) between the crossed lane line 240 and the wheel of the follow vehicle 210 is the same as the distance ($D_{X2}$) between the crossed lane line 240 and the wheel of the cooperatively driving first preceding vehicle 225, it may mean that the follow vehicle 210 has completely merged.

However, this corresponds to a situation according to an ideal operation, and the distance ($D_{X1}$) between the crossed lane line 240 and the wheel of the follow vehicle 210 may not be the same as the distance ($D_{X2}$) between the crossed lane line 240 and the wheel of the cooperatively driving first preceding vehicle 225 due to a variable according to a hardware operation or an actual operation even though the follow vehicle 210 has completely merged, and thus the first transverse threshold value ($X_{TH1}$) may be a value generated by multiplying the distance ($D_{X2}$) between the crossed lane line 240 and the wheel of the cooperatively driving first preceding vehicle 225 by the acceptable error rate a.

When it is determined that the follow vehicle 210 has completely merged with the cooperative driving in the merging completion determination step that can be performed as described above, the transmission of the information indicating that the follow vehicle 210 is merging by the second transmission step may be released in the merging completion step.

In the cooperative driving method according to an embodiment of the present invention as described above, the follow vehicle 210 may provide convenience to the driver of the follow vehicle 210 by merging with the cooperative driving. Further, the follow vehicle 210 may reduce fuel consumption through the decrease in sudden unintended acceleration or sudden braking, thereby acquiring an effect of improving fuel efficiency.

Further, in the cooperative driving method according to an embodiment of the present invention, the follow vehicle 210 may actively determine whether the follow vehicle has completely merged with the cooperative driving and not perform an unnecessary operation after the merging with the cooperative driving has been completed. That is, there is an effect of solving a problem in processing of more data than necessary and another problem including an operation delay according to the above problem.

Further, in the cooperative driving method according to the present invention, the follow vehicle 210 may further receive information on a cooperative driving number from the lead vehicle that assigns cooperative driving numbers based on the driving order after the merging with the cooperating driving in the first reception step according to an embodiment of the present invention described with reference to FIGS. 2A to 4.

Figure 5A:
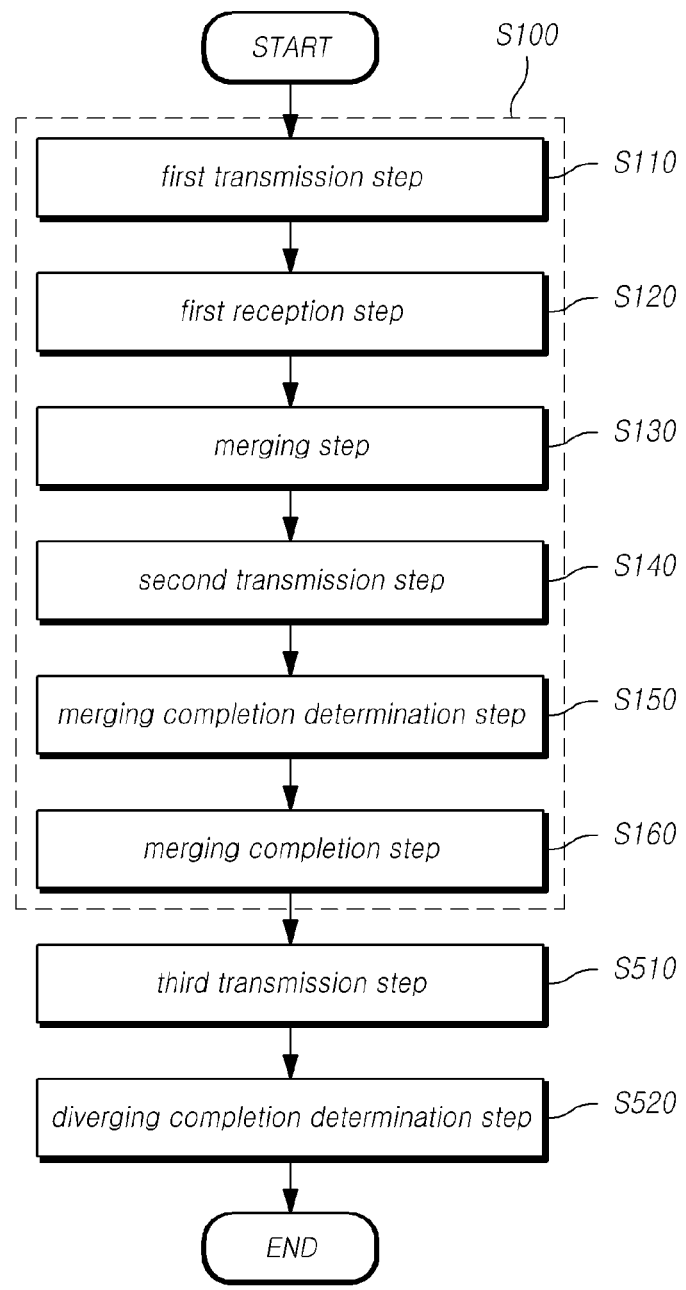
FIG. 5A is a flowchart illustrating a cooperative driving method according to another embodiment of the present invention.
Figure 5B:
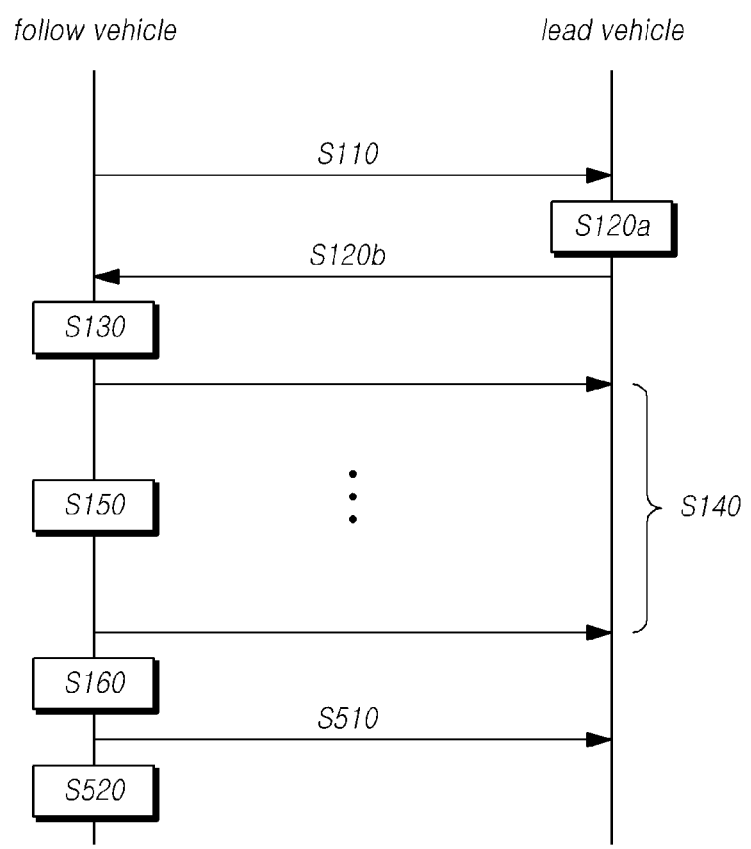
FIG. 5B illustrates an operation of the cooperative driving method according to the other embodiment of the present invention.

FIG. 5A is a flowchart illustrating a cooperative driving method according to another embodiment of the present invention, and FIG. 5B illustrates an operation of the cooperative driving method according to the other embodiment of the present invention.

Referring to FIGS. 5A and 5B, compared to the cooperative driving method S100 according to the embodiment of the present invention described through FIGS. 1 to 4, the cooperative driving method according to the other embodiment of the present invention may further include a third transmission step S510 of transmitting a diverging request to the lead vehicle and a diverging completion determination step S520 of determining whether the follow vehicle has completely diverged.

In the third transmission step S510, the follow vehicle may transmit the diverging request to the head vehicle through the V2X communication technology which is the same as that in the first transmission step S110 and the second transmission step S140.

In the diverging completion determination step S520, when a transverse distance between the lane line, which the follow vehicle crosses to diverge, and the wheel of the follow vehicle is larger than or equal to a second transverse threshold value, it may be determined that the follow vehicle has completely diverged.

The cooperative driving method according to the other embodiment of the present invention will be described in detail with reference to FIGS. 6 and 7.

Figure 6:
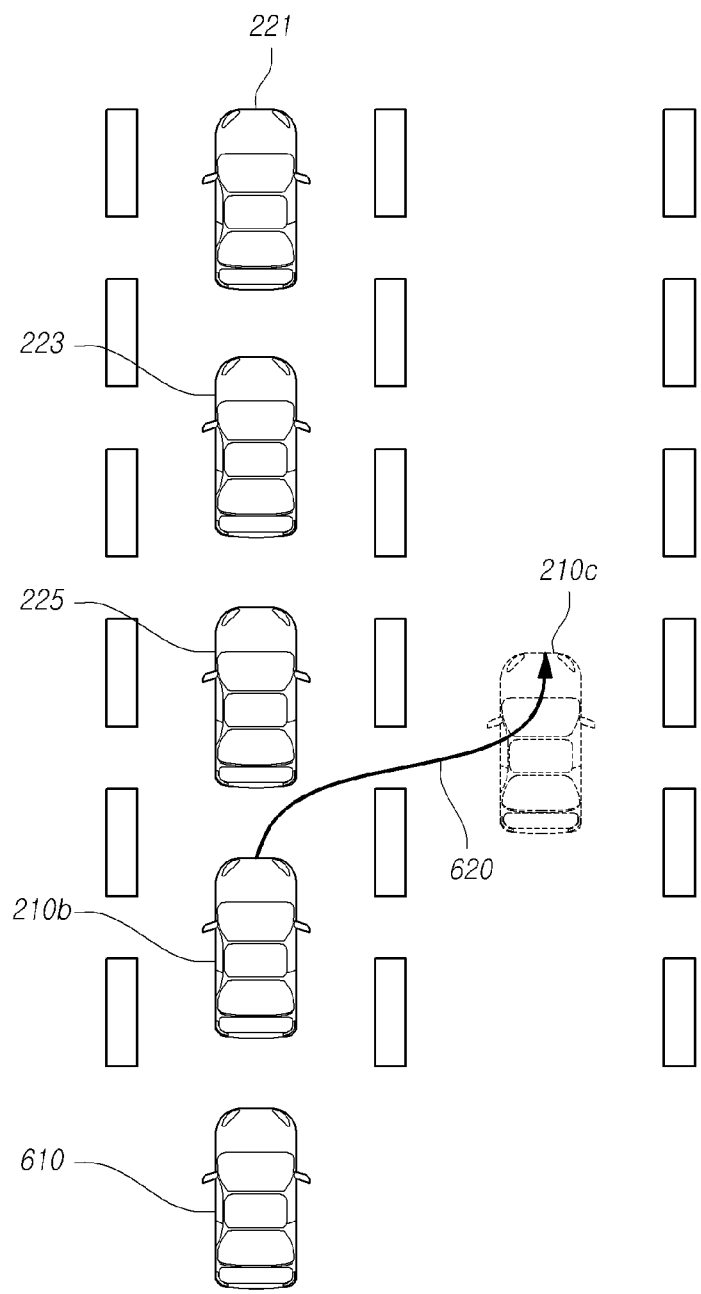
FIG. 6 illustrates the operation of the cooperative driving method according to the other embodiment of the present invention.
Figure 7:
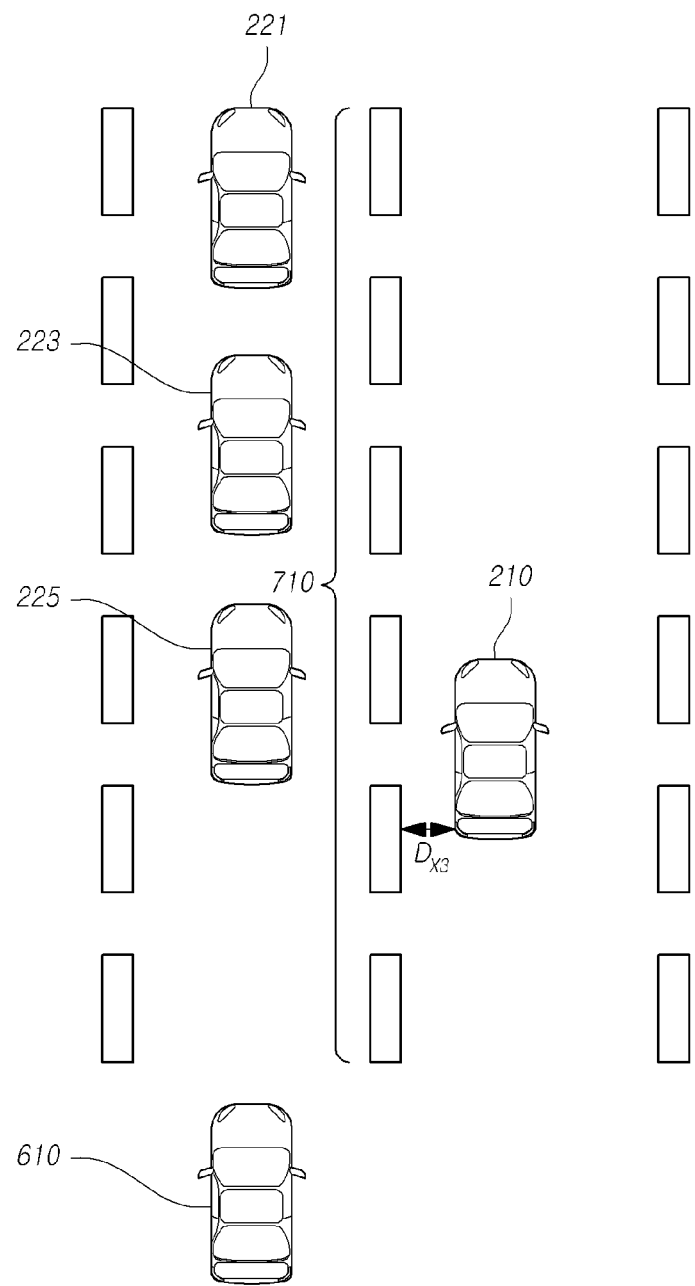
FIG. 7 illustrates an example of an operation in a diverging completion determination step according to the other embodiment of the present invention.

FIG. 6 illustrates an operation of the cooperative driving method according to the other embodiment of the present invention, and FIG. 7 illustrates an example for an operation of the diverging completion determination step according to the other embodiment of the present invention.

FIG. 6 illustrates a circumstance where the follow vehicle follows the lead vehicles 221, 223, and 225 based on the cooperative driving method according to the embodiment of the present invention described with reference to FIGS. 1 to 4 and a first trailing vehicle 610 further follows the follow vehicle 210 to cooperatively drive.

Referring to FIG. 6, in the third transmission step of the cooperative driving method according to the embodiment of the present invention, the follow vehicle 210b, which is cooperatively driving through the application of the cooperative driving method according to the embodiment of the present invention, may transmit a diverging request to the head vehicle 221.

In the third transmission step, the follow vehicle 210b may transmit information on the diverging request to the head vehicle 221 through the V2X communication technology.

Thereafter, the cooperatively driving follow vehicle 210b may become a follow vehicle 210c which diverges along a second driving path 620.

In a description related to FIG. 6, the follow vehicle 210b and the follow vehicle 210c may correspond to a follow vehicle which has not diverged and a follow vehicle which has completely diverged, respectively. Referring to FIG. 7, when equation (3) below is satisfied in which a transverse distance ($D_{X3}$) between a lane line 710, which the follow vehicle 210 crosses to diverge, and the wheel of the follow vehicle 210 is larger than or equal to a second transverse threshold value ($X_{TH2}$), it may be determined that the follow vehicle has completely diverged from the cooperative driving in the diverging completion determination step of the follow vehicle 210 which diverges along the second driving path 620.

$$D_{X3} \geq X_{TH2} \qquad \text{equation (3)}$$

In equation (3), $X_{TH2}$ may be a value according to a preset diverging programing.

Based on the cooperative driving method according to the other embodiment of the present invention described through FIGS. 5 to 7, the follow vehicle 210 may follow the head vehicle 221, which is driving, to cooperatively drive, and may diverge from the cooperative driving as necessary, so as to provide convenience to the driver of the follow vehicle 210. Further, the follow vehicle 210 may reduce fuel consumption through the decrease in sudden unintended acceleration or sudden braking, thereby acquiring an effect of improving fuel efficiency FIG. 8A is a flowchart illustrating a cooperative driving method according to another embodiment of the present invention, and FIG. 8B illustrates the cooperative driving method according to the other embodiment of the present invention.

Figure 8A:
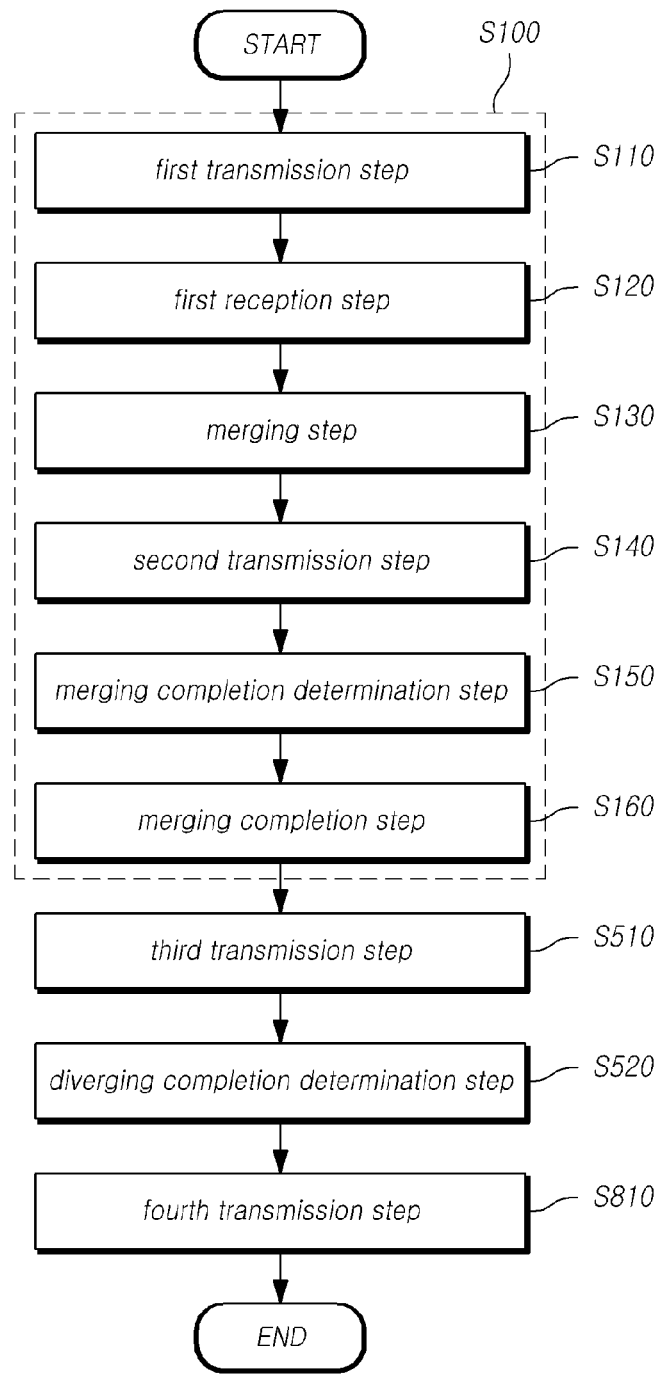
FIG. 8A is a flowchart illustrating a cooperative driving method according to another embodiment of the present invention.
Figure 8B:
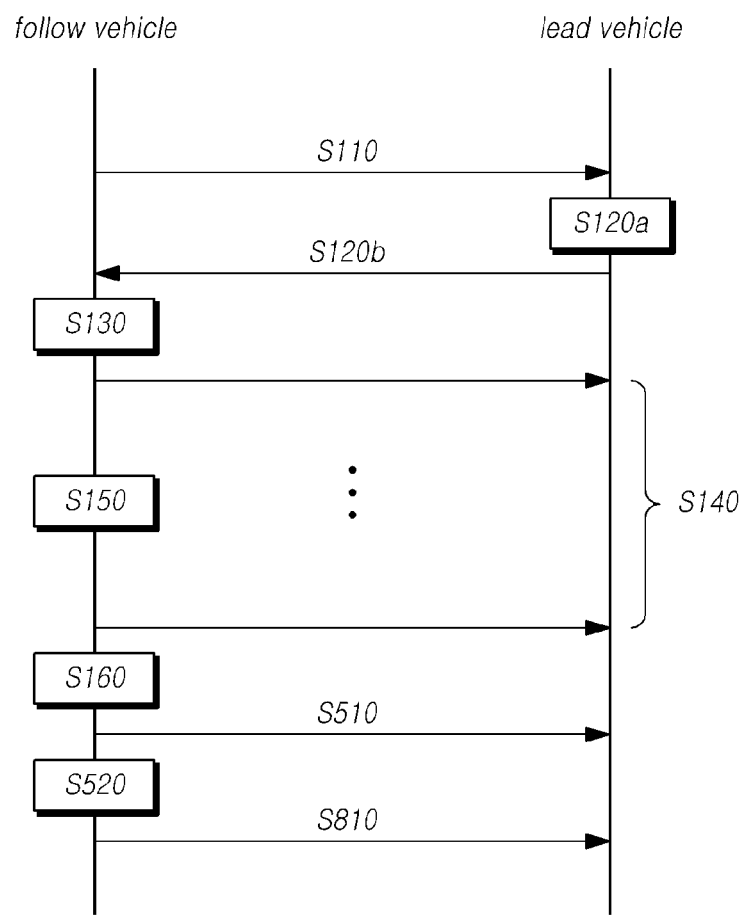
FIG. 8B illustrates an operation of the cooperative driving method according to the other embodiment of the present invention.

Referring to FIGS. 8A and 8B, compared to the cooperative driving method S100 according to the embodiment of the present invention described through FIGS. 1 to 4, the cooperative driving method according to the other embodiment of the present invention may further include the third transmission step S510 in which the follow vehicle transmits the information on the diverging request to the lead vehicle, the diverging completion determination step S520 of determining whether the follow vehicle has completely diverged, and a fourth transmission step S810 of, when it is determined that the diverging has been completed in step S520, transmitting information on a request for maintaining a cooperative driving distance to trailing vehicles including a first trailing vehicle.

The third transmission step S510 and the diverging completion determination step S520 may be the same as the diverging request step and the diverging completion determination step of the cooperative driving method according to the other embodiment of the present invention described through FIGS. 5 to 7.

After the fourth transmission step S810, the trailing vehicles including the first trailing vehicle may maintain the cooperative driving distance by reducing the interval generated due to the diverging of the follow vehicle.

This will be described in detail with reference to FIG. 9.

Figure 9:
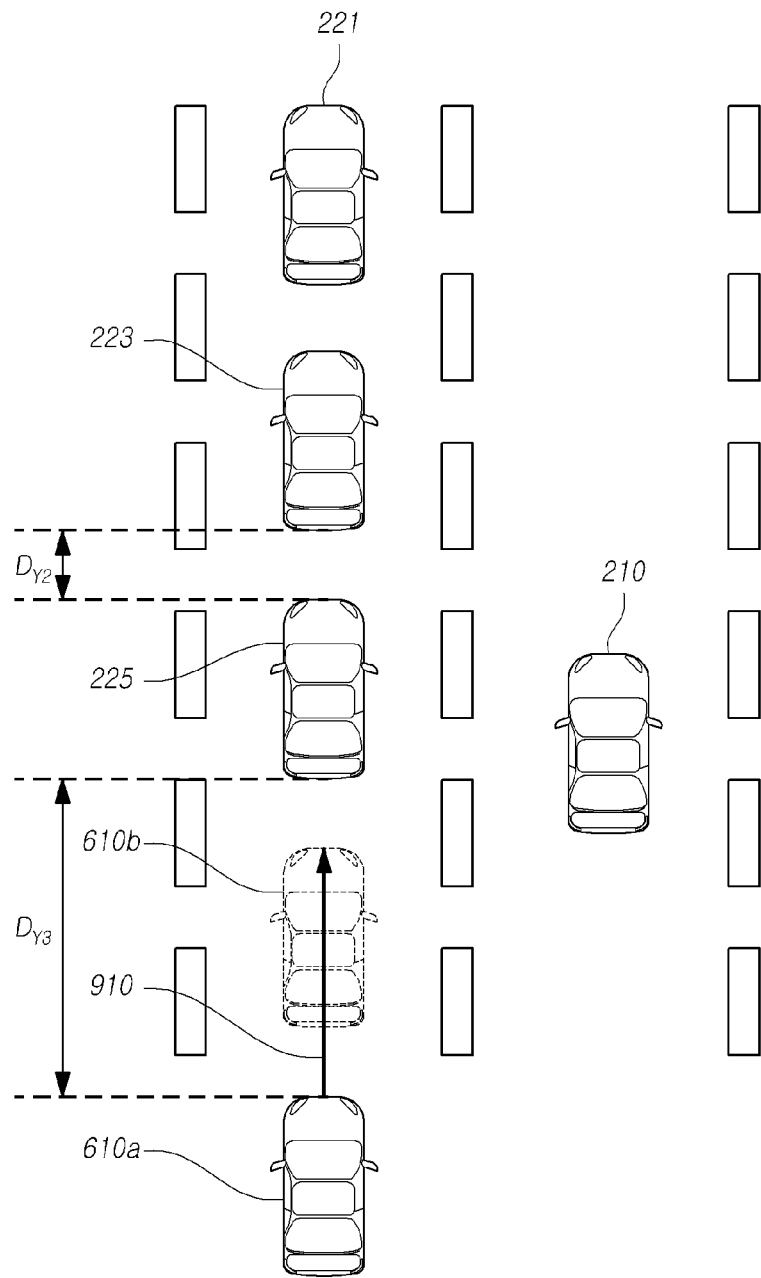
FIG. 9 illustrates an example of operations after a fourth transmission step according to the other embodiment of the present invention.

FIG. 9 illustrates an example of operations after the fourth transmission step according to another embodiment of the present invention.

FIG. 9 illustrates a state where the follow vehicle has completely diverged from the cooperative driving by the cooperative driving method according to the other embodiment of the present invention described through FIGS. 5 to 7.

Referring to FIG. 9, a distance ($D_{Y3}$) between the first preceding vehicle 225 and the first trailing vehicle 610a after the follow vehicle 210 has diverged may be as shown in equation (4).

$$D_{Y3}=2*D_{Y2}+L \qquad \text{equation (4)}$$

In equation (4), $D_{Y2}$ denotes a cooperative driving distance between the lead vehicles 221, 223, and 225, and L denotes a length of the follow vehicle 210.

After the fourth transmission step S810, the first trailing vehicle 610 may accelerate and make an acceleration control to reduce the distance ($D_{Y3}$) defined equation (4) to the cooperative driving distance ($D_{Y2}$).

The acceleration control may be performed according to a preset programing and, for example, the programing may be set to reduce the distance ($D_{Y3}$) to the cooperative driving distance ($D_{Y2}$) within a predetermined time. To this end, the first trailing vehicle 610 should detect a distance from the first preceding vehicle 225 through a device including a sensor.

Further, compared to the cooperative driving method according to the other embodiment of the present invention described through FIGS. 8A and 8B and FIG. 9, the cooperative driving method according to the present invention may further include a fifth transmission step of transmitting information on a request for assigning a cooperative driving number based on the driving order after the follow vehicle has diverged from the cooperative driving.

For example, when it is determined that the follow vehicle has completely diverged in the diverging completion determination step S520, the information on the request for assigning the cooperative driving number may be transmitted to the head vehicle to assign cooperative driving numbers based on the driving order in the fifth transmission step.

That is, the head vehicle 221, the second preceding vehicle 223, the first preceding vehicle 225, and the first trailing vehicle 610 may receive a first number, a second number, a third number, and a fourth number, respectively.

In each of the first transmission step, the first reception step, the merging step, the second transmission step, the merging completion determination step, and the merging completion step that are steps included in the cooperative driving methods described through FIGS. 1 to 9, the follow vehicle 210 and the lead vehicles 221, 223, and 225 or the follow vehicle 210 and the trailing vehicle 610 may exchange information on the step that is executed.

Accordingly, at least one driver of the follow vehicle 210, the lead vehicles 221, 223, and 225, and the trailing vehicle 610 may recognize the step that is being executed. Therefore, the driver may recognize if a problem in software or hardware has occurred and handle the problem.

Hereinafter, a cooperative driving apparatus, which is an apparatus performing the cooperative driving method according to the present invention described through FIGS. 1 to 9 will be briefly described.

Figure 10A:
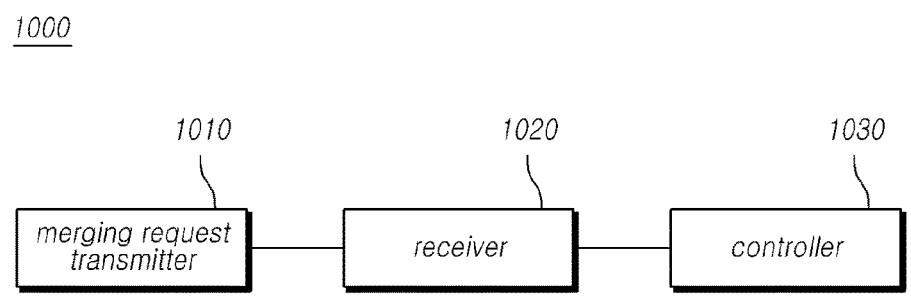
FIGS. 10A and 10B are block diagrams illustrating a cooperative driving apparatus according to an embodiment of the present invention.
Figure 10B:
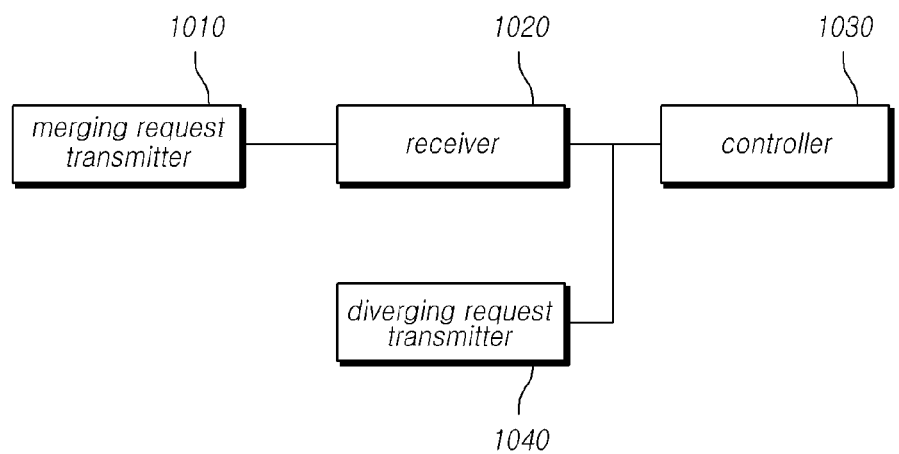

FIGS. 10A and 10B are block diagrams illustrating a cooperative driving apparatus according to an embodiment of the present invention, which include elements for an operation of the follow vehicle in the cooperative driving apparatus.

Referring to FIG. 10A, a cooperative driving apparatus 1000 according to an embodiment of the present invention may include a merging request transmitter 1010 for transmitting information on a merging request to a lead vehicle that is singly driving or cooperatively driving, a receiver 1020 for receiving information indicating whether the merging is possible from the lead vehicle, and a controller 1030 for, when the information indicating whether the merging is possible is received, controlling a steering device, an acceleration device, and a braking device to follow the lead vehicle.

The merging request transmitter 1010 and the receiver 1020 may use a Vehicle to Everything (V2X) communication technology including a Vehicle to Vehicle (V2V) communication technology and a Vehicle to Infrastructure (V2I) communication technology.

The follow vehicle may refer to a vehicle that follows the lead vehicle to cooperatively drive. The lead vehicle may be a singly driving vehicle or a cooperatively driving vehicle, or may include preceding vehicles except for a head vehicle.

That is, the merging request transmitter 1010 may transmit information on a merging request to the lead vehicle through the V2X communication technology. Further, the receiver 1020 may receive information indicating whether the merging is possible from the lead vehicle through the V2X communication technology.

When the information indicating that the merging is possible is received from the lead vehicle, the controller 1030 may control a steering device, an acceleration device, and a braking device to follow the lead vehicle.

For example, the controller 1030 may detect the outside of the vehicle through a sensor that senses the outside of the vehicle, generate a driving path along which the follow vehicle moves behind the lead vehicle according to the detected outside of the vehicle, and then control the steering device, the acceleration device, and the braking device to move along the driving path.

Referring to FIG. 10B, the cooperative driving apparatus 1000 according to another embodiment of the present invention may further include a diverging request transmitter 1040 for transmitting information on a diverging request to the lead vehicle.

Like the merging request transmitter 1010 and the receiver 1020, the diverging request transmitter 1040 may use the Vehicle to Everything (V2X) communication technology including the Vehicle to Vehicle (V2V) communication technology and the Vehicle to Infrastructure (V2I) communication technology.

That is, the diverging request transmitter 1040 may transmit information on a diverging request to the lead vehicle through the V2X communication technology.

When the diverging request transmitter 1040 transmits the information on the diverging request to the lead vehicle, the controller 1030 may control a steering device, an acceleration device, and a braking device to diverge from the cooperative driving.

The controller 1030 according to the other embodiment of the present invention may control the steering device, the acceleration device, and the braking device to move along a driving path along which the follow vehicle moves behind the lead vehicle according to the detected outside of the vehicle, and may further control the steering device, the acceleration device, and the braking device to move along the driving path along which the follow vehicle diverges from the cooperative driving according to the detected outside of the vehicle.

Figure 11:
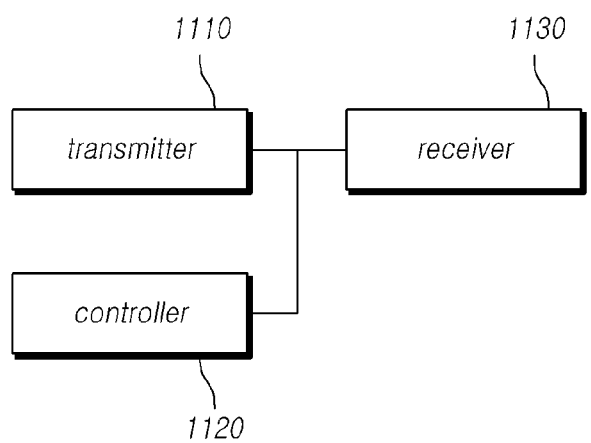
FIG. 11 is a block diagram illustrating a cooperative driving apparatus according to another embodiment of the present invention.

FIG. 11 is a block diagram illustrating a cooperative driving apparatus according to another embodiment of the present invention which includes elements for an operation of a lead vehicle in the cooperative driving apparatus.

Referring to FIG. 11, a cooperative driving apparatus 1100 according to an embodiment of the present invention includes a receiver 1120 for receiving information on a merging request from a follow vehicle, a controller 1130 for determining whether the follow vehicle can merge, and a transmitter 1110 for transmitting information indicating that the merging is possible to the follow vehicle.

The receiver 1120 may receive the information on the merging request from the follow vehicle and the information on the diverging request from the cooperatively driving vehicle.

When the information on the merging request is received from the follow vehicle, the controller 1130 determines whether the follow vehicle can merge and, when the follow vehicle can merge, transmits information indicating that the merging is possible to the follow vehicle through the transmitter 1110.

Further, the controller 1130 may transmit information on a first preceding vehicle that is cooperatively driving in front of a position where the follow vehicle is to merge to the follow vehicle. As the information on the first preceding vehicle is transmitted to the follow vehicle, the follow vehicle may identify the merging position and merge with the cooperative driving.

When the follow vehicle has completely merged, the controller 1130 resets cooperative driving numbers based on the driving order to include the follow vehicle and transmits the reset cooperative driving numbers to the cooperatively driving vehicles.

Further, the controller 1130 may transmit required driving information or control information to the cooperatively driving vehicles after the follow vehicle merges with the cooperative driving.

For example, when there is a vehicle that approaches a destination among the cooperatively driving vehicles, the controller 1130 may transmit a message that instructs the corresponding vehicle to diverge from the cooperative driving.

Accordingly, the controller 1130 transmits the message before receiving a diverging request from the cooperatively driving vehicle, and the cooperatively driving vehicle may prepare the diverging request.

When receiving the diverging message from the follow vehicle that has merged with the cooperative driving, the controller 1130 transmits information on the diverging request of the follow vehicle to the cooperatively driving vehicles.

Further, the controller 1130 transmits a message that instructs a first trailing vehicle, which is cooperatively driving behind the diverging follow vehicle, to maintain a current driving state while not closing the distance between vehicles when the follow vehicle diverges.

That is, even though the follow vehicle diverges, the first trailing vehicle may cooperatively drive while maintaining a current speed without closing the distance between vehicles.

When the follow vehicle has completely diverged, the controller 1130 may transmit the message again to maintain the cooperative driving distance to the first trailing vehicle and thus the first trailing vehicle may drive while maintaining the cooperative driving distance from the vehicle that is cooperatively driving in front of the first trailing vehicle.

Further, the cooperative driving apparatus according to the present invention may perform all the operations of the cooperative driving method of the present invention described through FIGS. 1 to 9.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A driving method performed by a controller including a processor configured to control a transmitter and a receiver, the controller to execute the driving method to join a follow vehicle in a plurality of vehicles including a lead vehicle, the driving method comprising:
   transmitting to the lead vehicle information on a merging request for joining the follow vehicle into a driving while the plurality of vehicles are already joined to be driving as the group;
   receiving information indicating whether merging for joining in the driving is possible from the lead vehicle which has determined whether the merging of the follow vehicle is possible or not based on predetermined conditions;
   merging, when the received information indicates that the merging for joining in the driving is possible, the follow vehicle into the plurality of vehicles;
   measuring a longitudinal distance between the follow vehicle and a first preceding vehicle among the plurality of vehicles; and
   determining that the merging of the follow vehicle is completed, when a value generated by subtracting
      a second time, which is generated by dividing a distance between the first preceding vehicle and a second preceding vehicle by a speed of the first preceding vehicle,
      from a first time, which is generated by dividing the longitudinal distance, which indicates a distance between the follow vehicle and the first preceding vehicle by a speed of the follow vehicle,
   is equal to or smaller than a preset longitudinal threshold value.

2. The driving method of claim 1, wherein the receiving of the information indicating that the merging is possible from the lead vehicle comprises receiving information on the first preceding vehicle that is driving in front of a position where the follow vehicle merges.

3. The driving method of claim 1, wherein the receiving of the information indicating that the merging is possible from the lead vehicle comprises receiving information on a driving number from the lead vehicle that has further assigned the driving number based on a driving order when it is determined that the merging is possible.

4. The driving method of claim 1, further comprising:

transmitting information indicating that the merging is being performed to the lead vehicle when the merging is being performed.

\* \* \* \* \*